Jan. 16, 1923.

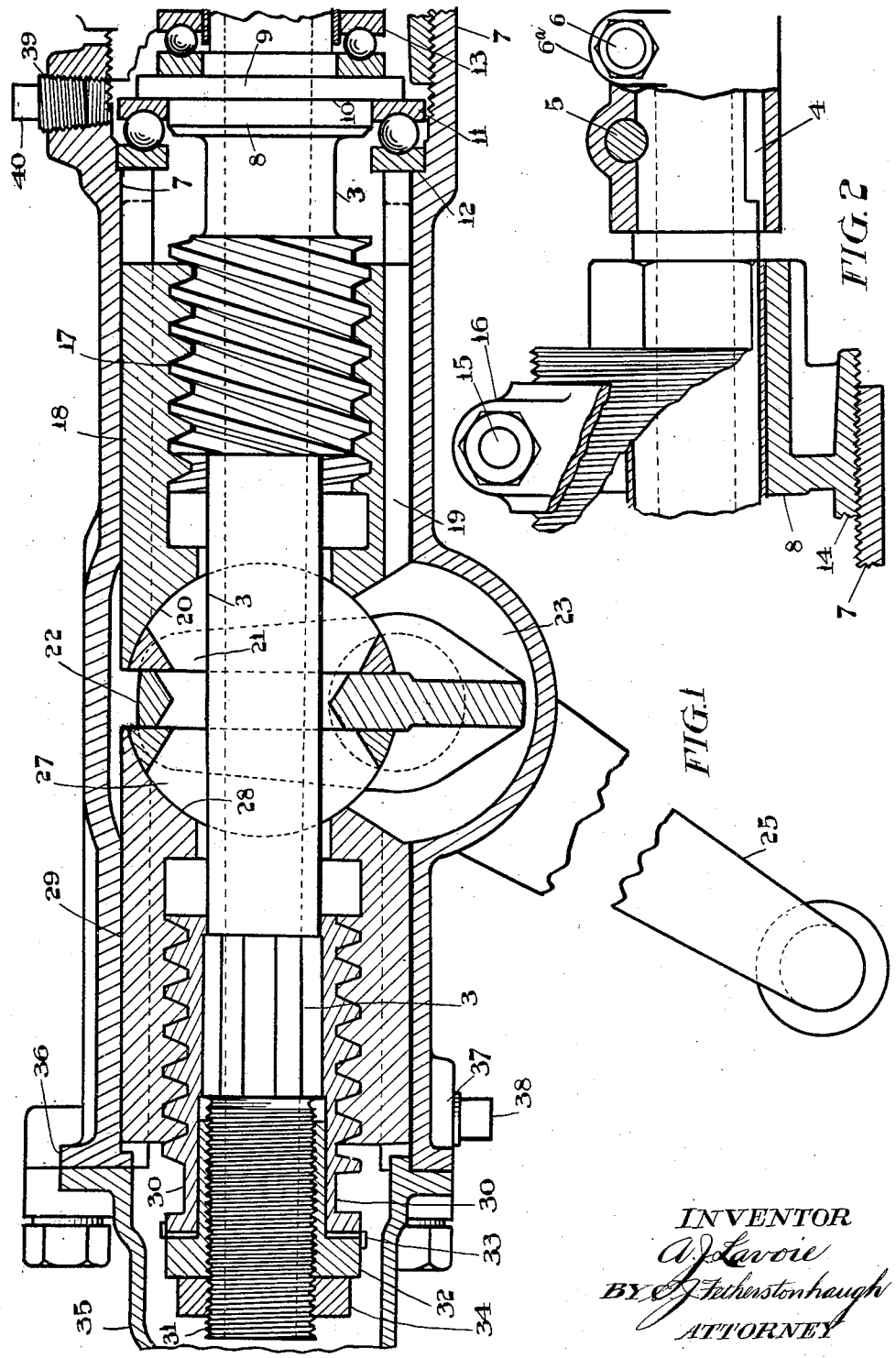

A. J. LAVOIE.
STEERING MECHANISM.
FILED NOV. 26, 1921.

INVENTOR
A. J. Lavoie
BY C. J. Fetherstonhaugh
ATTORNEY

Patented Jan. 16, 1923.

1,442,161

UNITED STATES PATENT OFFICE.

ALPHONSE JOSEPH LAVOIE, OF MONTREAL, QUEBEC, CANADA.

STEERING MECHANISM.

Application filed November 26, 1921. Serial No. 517,914.

*To all whom it may concern:*

Be it known that I, ALPHONSE JOSEPH LAVOIE, a subject of the King of Great Britain, and residing at the city of Montreal, in the Province of Quebec, in the Dominion of Canada, have invented a new and useful Steering Mechanism, of which the following is the specification.

The invention relates to a steering gear as described in the present specification and illustrated in the accompanying drawings that form part of the same.

The invention consists essentially of the novel features of construction pointed out broadly and specifically in the claims for novelty following a description in detail of the preferred form of the invention.

The objects of the invention are to avoid lost motion in steering apparatus and thereby insure more accurate work in guiding the vehicle, to facilitate the actuation of the wheels in their steering movements so that the slightest touch on the hand wheel will have the desired effect; to eliminate the ill effects of single thread engagement and the consequent strain on the gear and danger of stripping; and generally to provide a safe, durable and efficient steering gear and cheap to manufacture.

In the drawings, Figure 1 is a longitudinal sectional view of the operating mechanism of the gear.

Figure 2 is a sectional view being a continuation of Figure 1 showing the post end of the shaft.

Like numerals of reference indicate corresponding parts in the various figures.

Figure 3:
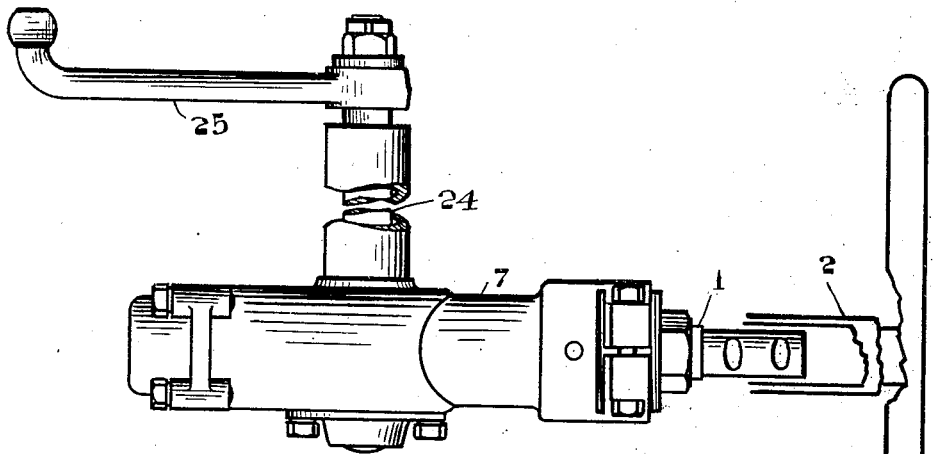
Figure 3 is a side elevation of the housing for the mechanism showing the position of the lever arm.
Figure 4:
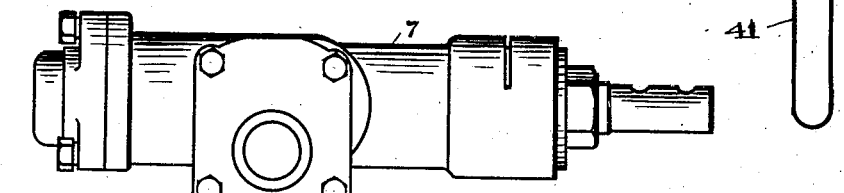
Figure 4 is a plan view of housing and lever arm.
Figure 5:
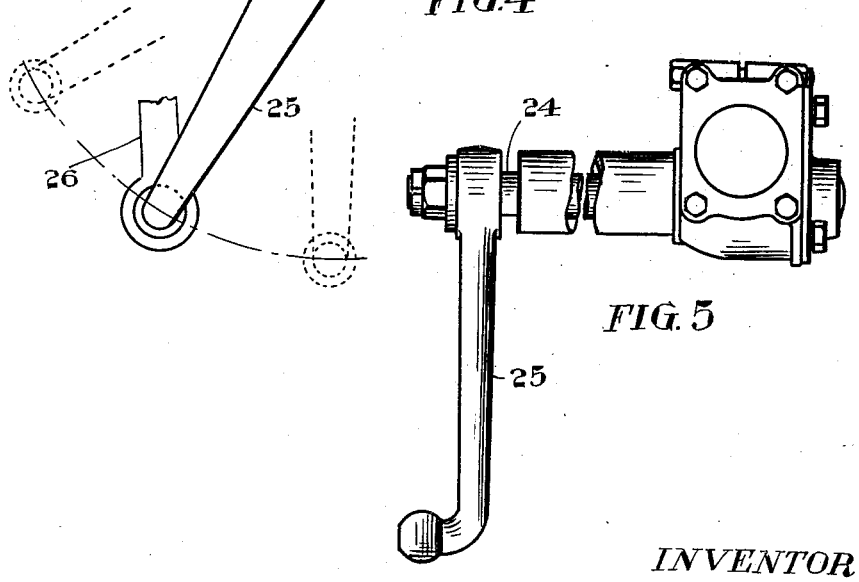
Figure 5 is an end view of housing and lever arm.
Figure 6:
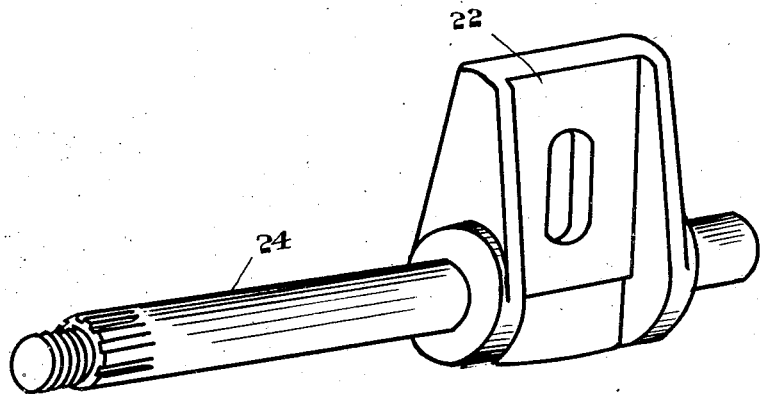
Figure 6 is a perspective detail of the crank lever.
Figure 9:
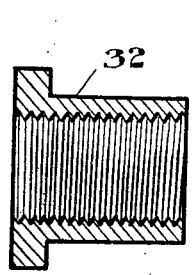
Figure 9 is a longitudinal sectional view of the adjusting nut.
Figure 8:
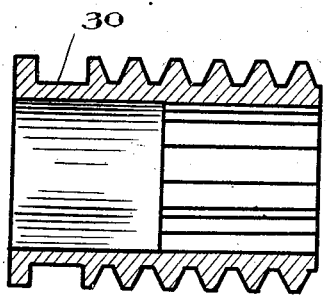
Figure 8 is a longitudinal sectional view of the lower screw.
Figure 7:
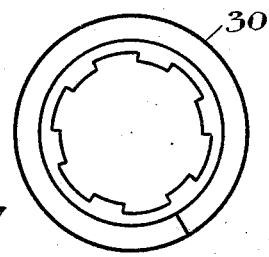
Figure 7 is a cross sectional view of the lower screw.

Referring to the drawings, the steering post 1 in the column 2 is coupled to the operating shaft 3 by the coupling key 4 and coupling bolt 5 clamped by bolt 6 drawing on the split casing lugs 6ª.

The shaft 3 extends into the housing 7 and the collar 8 and reduced collar 9 encircles said shaft within the housing 7 forming the shoulder 10 for the lower thrust bearing 11, which engages the shoulder 12 in the housing at its lower side.

The upper thrust bearing 13 is installed between the upper side of the collar 8 and the upper adjusting nut 14 screw threaded into the upper end of the housing 7 and clamped by the split housing through the lugs 15 by the screw bolt 16.

The shaft continues in the screw 17 which turns in the nut 18 and moves said nut downwardly and upwardly on the keys 19 which holds said nut from rotation, and act as guides.

The nut 18 is dished in the bottom end and forms a socket 20 for the oscillating shoe 21 which is loosely mounted on the crank lever 22, the latter being journalled at both sides of the housing and projecting laterally into the side chamber 23, the shaft section 24 extending through the housing and being pivotally secured to the lever arm 25, which in turn is swivelly secured to the reach rod 26.

The lower oscillating shoe 27 is mounted on the under side of the crank lever 22 and fits in the dished or socket end 28 of the nut 29. The nut 29 is operated upwardly and downwardly by the screw 30 splined on the shaft 3 at the lower end of said shaft 3 being externally threaded at 31 and having the adjusting screw 32 mounted thereon and engaging the outer end of the screw 30 for taking up the lost motion. The lock washer 33 is inserted between the screw 30 and adjusting screw 32 and the jam nut 34 tightens these parts to their places.

The housing at its lower end is closed in by the cap 35 securely bolted to the housing flange 36 just below the drain opening 37 closed by the plug 38.

The cap may if desired be formed with an opening in the line with the hollow shaft 3 and a control rod passed therethrough but this does not alter the main operating features of this invention.

The oiling opening 39 is situated in the housing opposite the thrust bearings and is closed by the plug 40. The hand wheel 41 is shown in outline at the end of the post 1.

In the operation of this invention, presuming that the screws are made with right hand threads, the hand wheel is turned to the right and this forces the upper downwardly and the oscillating shoe also moves downwardly which has the effect of turning the crank lever and pushing down on the lower oscilalting shoe which recedes with the lower nut into which it is socketed.

The shaft section of the crank lever is thereby turned and swings the lever, which through its reach turns the wheels of the vehicle for a right turn. Similarly a turn to the left is accomplished by lifting the lower shoe against the crank lever and turning said crank lever the other way, swinging the lever arm so that the reach rod effects a pull or a push in the opposite direction as the case may be.

The oscillating shoes 21 and 27 are shown as mounted on the upper end and lower sides of the crank lever and formed in arch shape, the shaft 3 passing through said shoes in elongated slots and through said crank lever 22 which also has an elongated slot with the reverse bevels.

What I claim is:

1. In a steering mechanism, a steering post, shaft bearings supported therefrom, a shaft journalled in said bearings and a fixed screw thereon, an adjustable sliding screw on said shaft, nuts mounted on said screws and crank members having the crank lever fulcrumed centrally in respect to the axes of said screws and shaft.

2. In a steering mechanism, a housing, non-rotative nuts slidably arranged in said housing, shaft bearings contained in said housing, crank members including oscillating shoes and a crank lever imparting movement to the crank shaft, a shaft extending through said lever and shoes and journalled in said shaft bearings and a fixed screw and adjustable sliding screw on said shaft and a steering post operatively secured to said shaft.

3. In a steering mechanism, a housing having a central crank lever chamber and a plate covering for one end of said chamber forming a bearing for a crank shaft, non-rotative nuts slidably arranged in said housing, shaft bearings contained in said housing, crank members including oscillating shoes and a lever imparting movement to the crank shaft, a shaft extending through said crank lever and shoes and journalled in said shaft bearings and a fixed screw and adjustable sliding screw on said shaft and a steering post operatively secured to said shaft.

4. In a steering mechanism, a housing, nuts having sliding key connection on opposite sides with the inner wall of said housing, shaft bearings contained in said housing, crank members including oscillating shoes and a crank lever imparting movement to the crank shaft, a shaft extending through said lever and shoes and journalled in said shaft bearings and a fixed screw and adjustable sliding screw on said shaft and a steering post operatively secured to said shaft.

5. In a steering mechanism, a housing, nuts having sliding key connection with the inner wall of said housing and recessed inner ends forming shoe sockets, shaft bearings contained in said housing, crank members including oscillating shoes and a crank lever imparting movement to the crank shaft, a shaft extending through said lever and shoes and journalled in said shaft bearings and a fixed screw and adjustable sliding screw on said shaft and a steering post operatively secured to said shaft.

6. In a steering mechanism, a housing, non-rotative nuts slidably arranged in said housing, shaft bearings adjustably mounted in said housing, crank members including oscillating shoes and a crank lever imparting movement to the crank shaft, a shaft extending through said crank lever and shoes and journalled in said shaft bearings and a fixed screw and adjustable sliding screw on said shaft and a steering post operatively secured to said shaft.

7. In a steering mechanism, a housing, non-rotative nuts slidably arranged in said housing, bearings encircling the shaft, a nut screwed into said housing and engaging said bearings, crank members including oscillating shoes and a crank lever imparting movement to the crank shaft, a shaft extending through said lever and shoes and journalled in said shaft bearings and a fixed screw and adjustable sliding screw on said shaft and a steering post operatively secured to said shaft.

8. In a steering mechanism, a housing, non-rotative nuts slidably arranged in said housing, shaft bearings contained in said housing, crank members including a pivoted lever plate having an elongated shaft hole therein and forming a crank lever and oscillatory shoes on top and bottom of said plate having shaft holes and recessed in said nuts, a shaft extending through said crank lever and shoes and journalled in said shaft bearings and a fixed screw and adjustable sliding screw on said shaft and a steering post operatively secured to said shaft.

9. In a steering mechanism, a housing, non-rotative nuts slidably arranged in said housing, shaft bearings contained in said housing, crank members including a lever plate having top and bottom flat surfaces and shaft hole and mounted on a crank shaft suitably journalled and projecting outwardly from the housing and oscillatory shoes having shaft holes and arc-shaped backs recessed in the ends of the nuts, a shaft extending through said lever plate and shoes and journalled in said shaft bearings and a fixed screw and adjustable sliding screw on said shaft and a steering post operatively secured to said shaft.

10. In a steering mechanism, a housing, non-rotative nuts slidably arranged in said housing, shaft bearings contained in said housing, crank members including oscillating shoes and a crank lever imparting movement to the crank shaft, a shaft extending through said lever and shoes and formed with a collar and a fixed intermediate screw, and an adjusting nut engaging said collar through a bearing.

11. In a steering mechanism, a housing, non-rotative nuts slidably arranged in said housing, shaft bearings contained in said housing, crank members including oscillating shoes and a crank lever imparting movement to the crank shaft, a shaft extending through said lever and shoes and having an upper bearing and a lower bearing and a collar therebetween, and a nut screwed into said housing and engaging the upper bearing pressing on said collar.

Signed at Montreal Canada, this 22nd. day of November 1921.

ALPHONSE JOSEPH LAVOIE.